United States Patent [19]
Taki et al.

[11] Patent Number: 5,649,887
[45] Date of Patent: Jul. 22, 1997

[54] MACHINE TOOL PROVIDED WITH TOOL CHANGER

[75] Inventors: Yukio Taki, Kounan; Yukiharu Takehara, Niwa-gun, both of Japan

[73] Assignee: Okuma Corporation, Nagoya, Japan

[21] Appl. No.: 649,481

[22] Filed: May 17, 1996

[30] Foreign Application Priority Data

May 24, 1995 [JP] Japan ................... 7-151050

[51] Int. Cl.⁶ ................................. B23Q 3/157
[52] U.S. Cl. .................................... 483/3
[58] Field of Search ............... 483/3, 2, 38, 41, 483/49, 57

[56] References Cited

U.S. PATENT DOCUMENTS

| | | | |
|---|---|---|---|
| 3,775,837 | 12/1973 | Tomita et al. | 483/41 |
| 3,930,302 | 1/1976 | Ochiai et al. | 483/3 |
| 4,274,192 | 6/1981 | Norimatsu | 483/41 |
| 4,335,498 | 6/1982 | Hague et al. | 483/49 |
| 4,654,953 | 4/1987 | Hobbs | 483/38 X |
| 4,679,296 | 7/1987 | Watanabe | 483/57 |
| 4,831,714 | 5/1989 | Babel et al. | 483/3 |
| 5,224,916 | 7/1993 | Chang | 483/3 |

FOREIGN PATENT DOCUMENTS

| | | | |
|---|---|---|---|
| 6152549 | 11/1981 | Japan | 483/3 |
| 186544 | 10/1983 | Japan | 483/3 |
| 63-113530 | 7/1988 | Japan. | |
| 63-133945 | 9/1988 | Japan. | |
| 4-17312 | 4/1992 | Japan. | |
| 5-33242 | 8/1993 | Japan | 483/3 |
| 6-63833 | 3/1994 | Japan. | |

Primary Examiner—William R. Briggs
Attorney, Agent, or Firm—Oliff & Berridge

[57] ABSTRACT

An ATC according to the invention swivels a changer arm 44 by means of a first cam 24, pulls out a tool and brings a replacement tool into position by means of a second cam, open/closes a sliding cover 61 by way of a chain 62 and over-drive gears 53, 58 and 55, 59 by means of a third cam, exploiting a slight rotation of an arm shaft 51 and clamps/unclamps the tool T on a spindle by feeding actuator oil to a hydraulic cylinder on the spindle head side by driving a piston pump 47 by a fourth cam 25. Additionally, a shift gear 34 is moved by a hydraulic cylinder 29 to drive either the cam shaft 21 or the magazine drive shaft 31 by means of a motor 14 so that the four cams can be driven by a single cam and, at the same time, the tool magazine is also swivelled and indexed by the same motor.

5 Claims, 11 Drawing Sheets

MACHINE TOOL PROVIDED WITH TOOL CHANGER

BACKGROUND OF THE INVENTION

1. Field of the Invention

This invention relates to a machine tool and, more particularly, to a machine tool provided with an automatic tool changer (hereinafter referred to as ATC) that automatically changes tools according to requirements of an on-going machining process.

2. Prior Art

ATCs that are currently used for machine tools in machining facilities, such as machining centers, normally involve the use of a plurality of actuators for changing tools. However, such an arrangement has the drawback that a long time is required for changing tools because the overall configuration of the ATC is very complicated and bulky and requires an exchange many signals between any two successive machining operations. In view of this problem, Japanese Utility Model Application Laid-Open No. 63-113530 proposed the use of a pair of coupled cams for slewing the exchanger arm and pulling out/feeding in tools. Japanese Utility Model Application Laid-Open No. 63-133945 further proposed the use of an additional cam for opening and closing the arm claw and another additional cam for unclamping the spindle tool. Japanese Utility Model Publication No. 5-33242 has also disclosed the use of cams for opening and closing the ATC door in addition to swivelling the exchanger arm and pulling out/feeding in tools.

FIG. 1 schematically illustrates an ATC unit according to Japanese Patent Application Laid-Open No. 6-63833. The unit shown operates to clamp, unclamp or remove a tool. To clamp or unclamp a tool, a draw bar 107 is moved within a spindle 105 by a spring 106 and a cam 108, that is driven to rotate by a motor 100A by way of a drive shaft 109. In clamping, the draw bar 107 is urged into the spindle 105 by coned disc springs 106 and thus draws a tool T into the spindle 105 by counter-sunk springs 106 until the tool T is clamped within the spindle 105. To unclamp and replace the tool with another tool, the draw bar 107 is pushed out of the spindle by the cam 108 until the tool T is unclamped. The tool is then moved away by an exchanger arm 101 that is driven to operate in a controlled manner by a pair of cams 102, 103 that are driven by a motor 100B by way of a drive shaft 104.

In order for a tool changer to automatically change tools, the following five operations have to be carried out. (not in this order)

(1) The changer arm pulls the existing tool out of the tapered hole which houses the tool and inserts the replacement tool.
(2) The changer arm swivels the tool.
(3) The tool in the spindle is clamped and unclamped.
(4) The ATC protective cover is opened and closed.
(5) The tool magazine is swivelled and indexed.

A tool changer according to the above cited Japanese Utility Model Application Laid-Open No. 63-113530 does not cover (3), (4) and (5) above. Both Japanese Utility Model Application Laid-Open No. 63-133945 and the Japanese Utility Model Publication No. 6-63833 do not cover (4) and (5). Therefore, with any of the above tool changers, the operations that are not covered by the tool changer have to be controlled independently by using one or more limit switches for detecting the end of the covered operations and/or the end of any of the independently controlled operations. Such limit switches are subject to breakage and can affect the reliability of the tool changer. Additionally, a limit switch requires time to confirm its proper functioning and this consequently prolongs the time required for changing tools. Finally, the use of independent motors is also required for any operations not covered by the tool changer, thus increasing the overall cost.

SUMMARY OF THE INVENTION

In view of the above identified problems of the prior art, it is an object of the present invention to provide a machine tool provided with an ATC that can of carry out operations (1) through (4) above and change tools by a single turn of each of four cams.

It is another object of the present invention to provide a machine tool provided with an ATC that can carry out the operations (1) through (5) above and change tools by means of single motor.

According to the invention the above objects are achieved by providing a machine tool comprising a tool magazine which contains a plurality of tools and a tool changer for selecting a desired tool out of the tool magazine and replacing the tool currently being held by a mechanism of the machining unit of the machine tool with the newly selected tool. The machine tool is characterized by the tool changer, which comprises, an exchanger arm for holding the replacement tool and the tool to be removed an exchanger arm drive mechanism for moving the exchanger arm back and forth and swivelling it; a clamp for securing a tool to the machining unit; a clamping/unclamping control mechanism for controlling the clamp; a protective cover for protecting the tool changer from the dust produced by machining operations; and a protective cover opening/closing mechanism for opening and closing the protective cover during tool changes.

The exchanger arm drive mechanism includes a first cam for controlling the swivelling motion of the exchanger arm and a second cam for controlling the reciprocating motion of the exchanger arm.

The clamping/unclamping control mechanism comprising a third cam for controlling the clamped or unclamped state of the clamp for the tool held by the machining unit. The protective cover drive mechanism comprising a fourth cam for controlling the opening/closing motion of said protective cover. Further more the tool changer includes a single drive motor which simultaneously drives the first, second, third and fourth cams.

With an arrangement as defined above, because the four cams are driven simultaneously, by a single drive motor, the reciprocating and swivelling motions of the changer arm, the tool clamping/unclamping motion and the protective cover opening/closing motion are completely synchronized. In other words, the timing of each of the motions does not have to be regulated. Also, the overall configuration of the machine tool can be further simplified because the four cams are driven by a single transmission system. Further, since operations, such as confirming the end of a motion and switching to the next motion, do not require electrical signals, the electric switching systems that would conventionally be used for such operations as detecting the end of a motion can be eliminated.

Additionally, no extra time is required between any two successive motions in order to confirm the end of the preceding motion, and hence the overall time required for the operation of changing tools can be significantly reduced. Finally, since the electric switching system for carrying out such operations as detecting the end of a motion is eliminated, the machine tool is free from problems due to defective contacts.

A machine tool according to the invention may additionally comprise a tool indexing mechanism for driving the tool magazine to rotate and index a desired tool for a tool change. In this situation, the tool indexing mechanism can be driven by the same drive motor used for driving the four cams and a switch mechanism for connecting the drive motor selectively to the four cams or to the tool indexing mechanism.

With such an arrangement, the dimensions and the cost of the machine tool can be minimized because no additional motor is required for driving the tool indexing mechanism.

A further aspect of a machine tool according to the invention may also include a lock mechanism that locks the tool indexing mechanism when the four cams are selected and connected to the drive motor and locks the cam shaft when the tool indexing mechanism is selected and connected to the drive motor. With such an arrangement, the unselected mechanism can be securely held in place.

A machine tool according to the invention may be so arranged that the clamping/unclamping control mechanism comprises a hydraulic pump, driven by the third cam, a hydraulic cylinder, disposed on the tool holding mechanism of the machining unit, a pair of oil lines, each connecting a cavity of the hydraulic pump and that of the hydraulic cylinder, and a relief valve which partly releases the actuator oil from either one of the oil lines to the other oil line when the oil pressure exceeds a predetermined level.

In this configuration, the hydraulic pump discharges, each time, an amount of actuator oil greater than the volume of the cavity of the hydraulic cylinder.

With the above arrangement, the hydraulic cylinder can securely operate for a full stroke without producing excessive pressure in the currently operating oil line. In other words, the actuator oil discharged after the hydraulic cylinder operates for a full stroke is released to the other oil line to suppress any pressure rise. A predetermined pressure level is selected for the relief valve so that the oil will be released accordingly.

DESCRIPTION OF THE PREFERRED EMBODIMENTS

Now, the present invention will be described in greater detail by referring to the accompanying drawings that illustrate the preferred embodiments of the invention.

Figure 1:
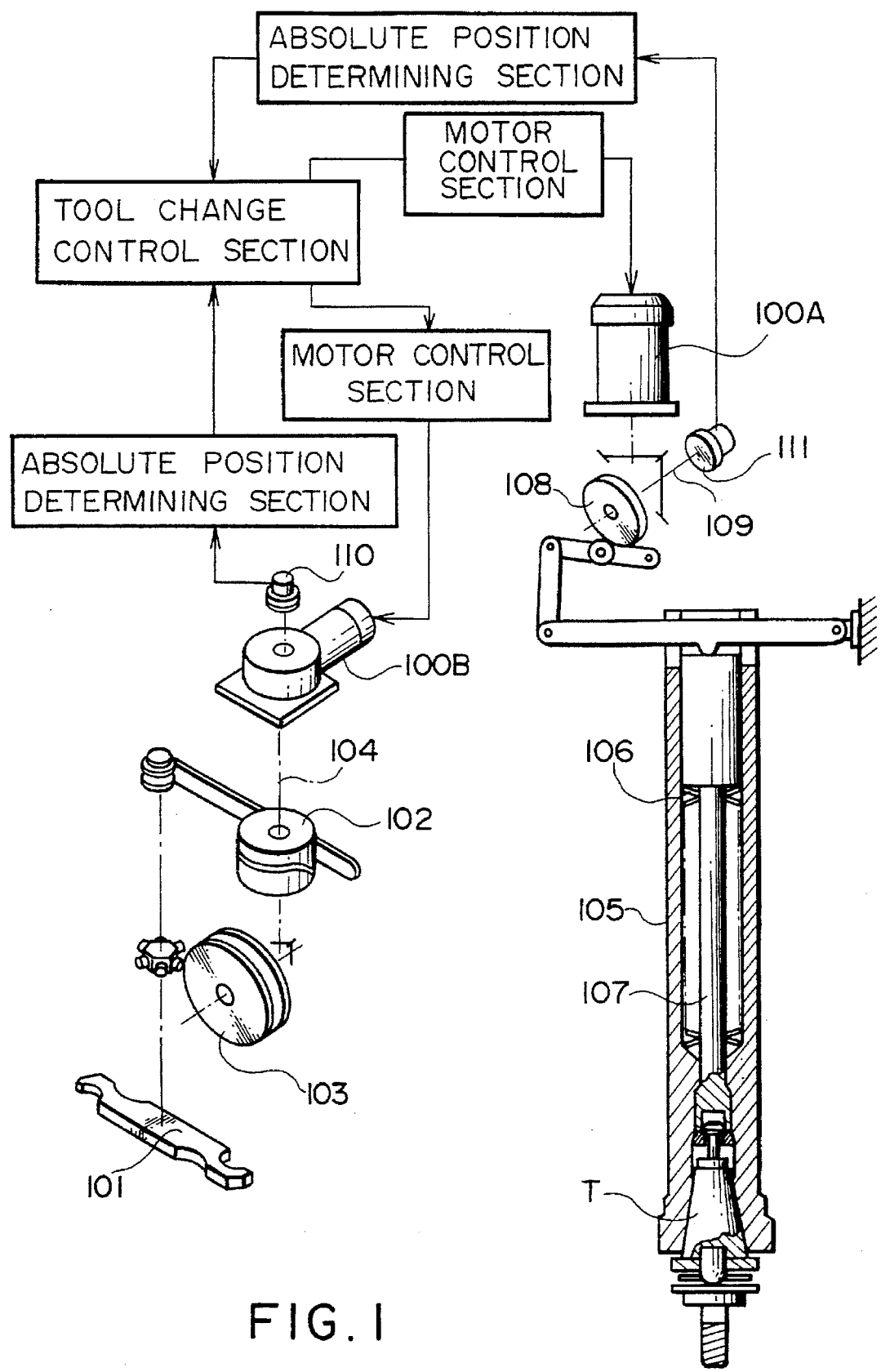
FIG. 1 is a schematic block diagram of a known automatic tool changer.
Figure 2:
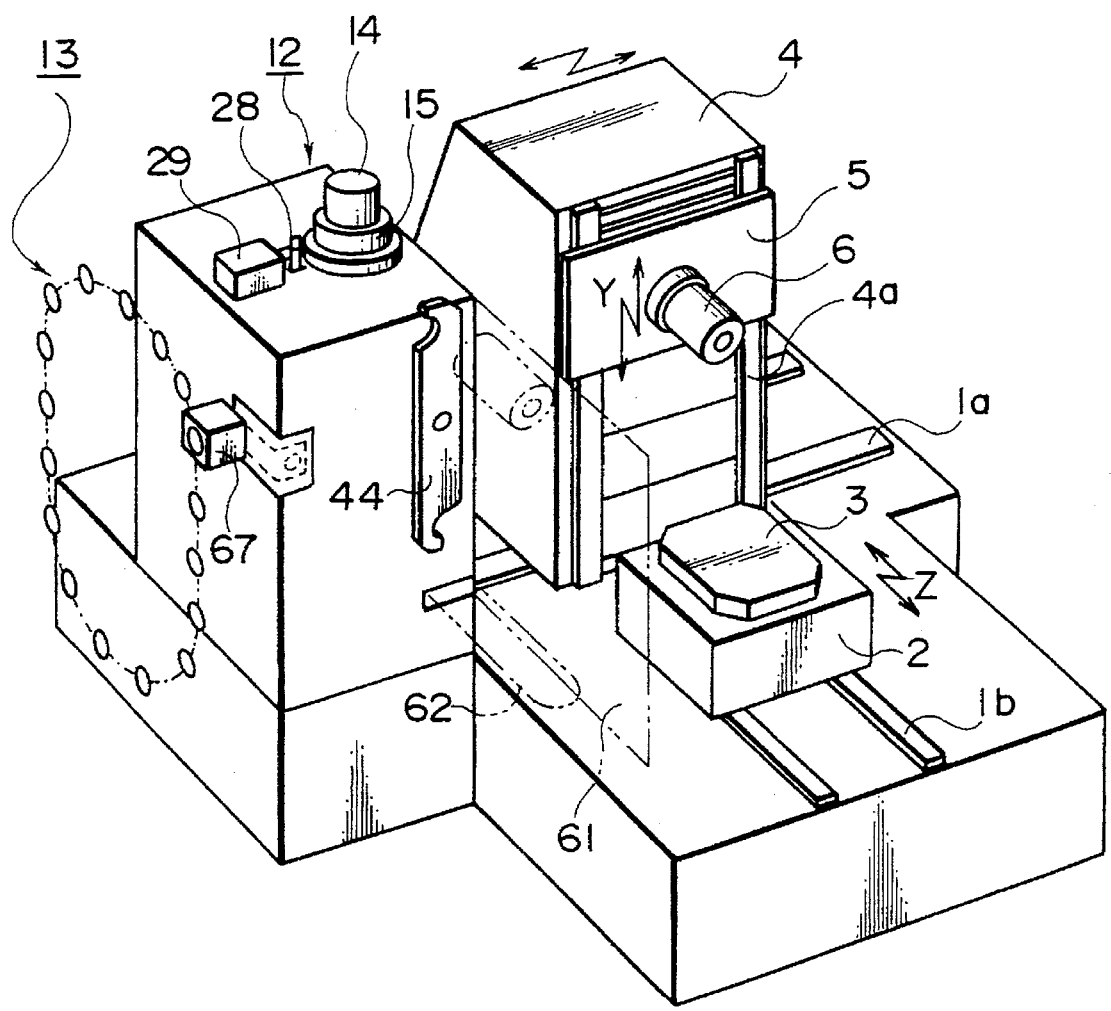
FIG. 2 is a schematic perspective view of a machining center provided with an embodiment of ATC having four linked cams according to the invention.
Figure 3:
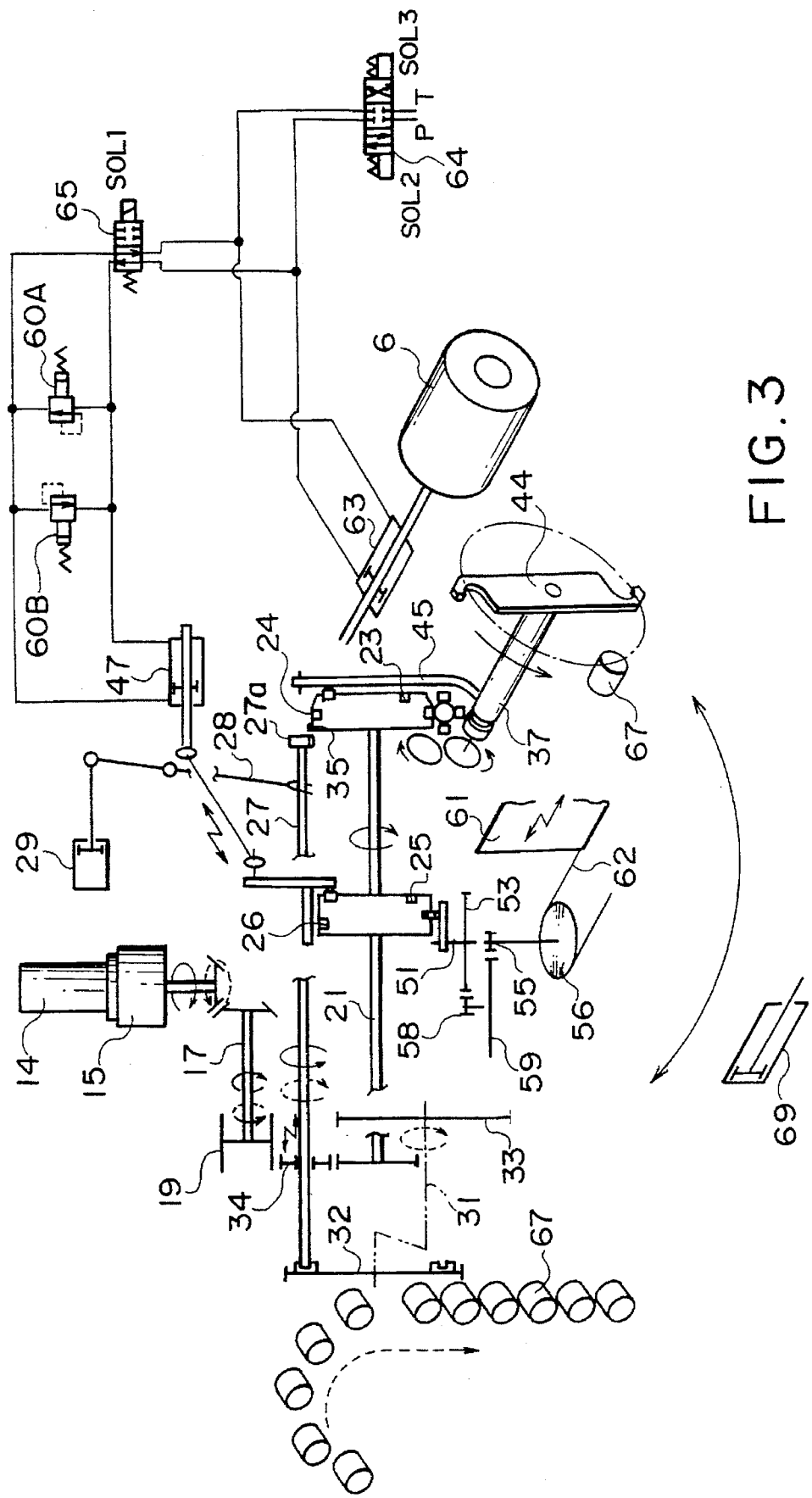
FIG. 3 is a schematic diagram of the embodiment of the ATC of FIG. 2, illustrating its principal configuration, the second and fourth cams being shown on the opposite side (right side) in order to make them easily visible.

FIG. 2 is a schematic perspective view of a machining center provided with an embodiment of an ATC according to the invention. FIG. 3 is a schematic diagram of the embodiment of an ATC of FIG. 2, illustrating its principal configuration.

A pair of transverse (X-axis) guide rails 1a and a pair of longitudinal (Z-axis) guide rails 1b are arranged on a bed which is laid on the floor. A table main body 2 is movably mounted on the Z-axis guide rails 1b and a swivel table 3 is arranged on the table main body 2. The swivel table 3 is adapted for rotating around a vertical axis (Y-axis) and indexing.

Figure 4:
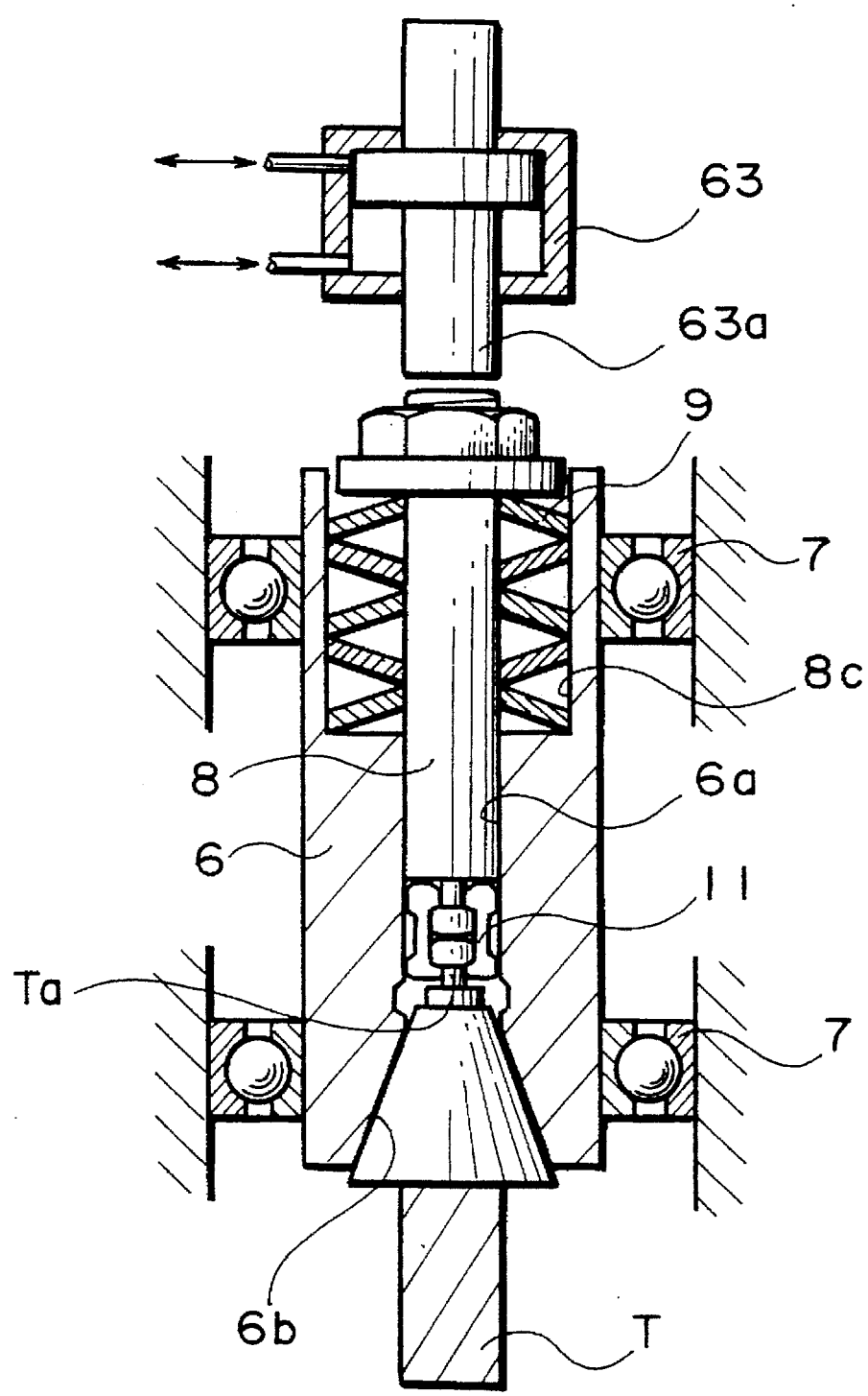
FIG. 4 is a sectional view of a top portion of the spindle of the embodiment of FIG. 2 and some of the related components.

A column 4 is movably mounted on the X-axis guide rails 1a while a spindle head 5 is movably mounted on a pair of vertical (Y-axis) guide rails 4a. As shown in FIG. 4, a spindle 6 is horizontally and rotatably supported by the spindle head 5 by way of bearings 7 and provided with a central bore 6a and a tapered hole 6b connected to the central bore 6a at the front end thereof. An axially movable draw bar 8 is housed in the spindle central bore 6a and constantly urged into the spindle central bore by a plurality of coned disk springs 9 housed in a large bore 8c that is formed along the axis of the spindle 6 and connected to the central bore 6a. The draw bar 8 is provided at the front end thereof with a collet 11, which holds the pull stud Ta of a tool T and pulls the tool T by the biasing force of the coned disk springs 9 so that the latter abuts the peripheral wall of the tapered hole 6b. The biasing force is so strong that the tool T is reliably driven to cut a workpiece.

An ATC 12 is arranged to the left of the column 4 and a tool magazine 13 is arranged along the left side wall of the ATC 12 in FIG. 2. A servo motor 14 for NC control is rigidly secured to the top of the ATC 12 by way of a reduction gear unit 15.

Figure 5:
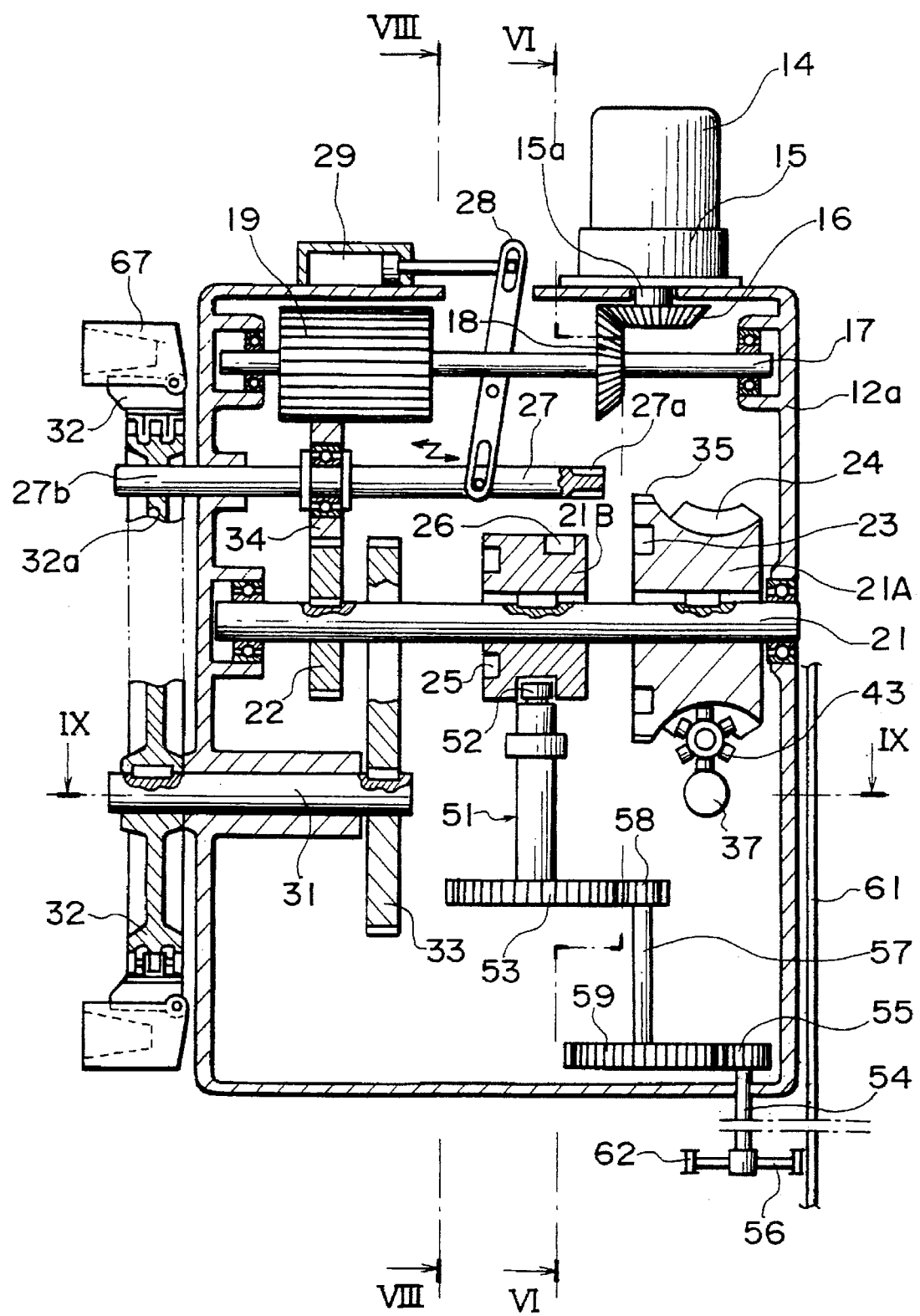
FIG. 5 is a sectional view of the embodiment of FIG. 2 taken along line V—V of FIG. 6.

FIG. 5 illustrates the internal structure of the ATC 12, specifically the transmission mechanism of the ATC 12 for transmitting power to various mechanisms, which will be described hereinafter. FIG. 5 is a sectional view of the embodiment taken along line V—V of FIG. 6.

An output shaft 15a projects into the case 12a of the ATC 12 by way of the reduction gear unit 15 and a bevel gear 16 is rigidly secured to the output shaft 15a. A drive shaft 17 extends along the X-axis directly below the output shaft 15a and rotatably held there. A bevel gear 18 that is in mesh with the bevel gear 16 and a long gear 19 are rigidly secured to the drive shaft 17.

Figure 7:
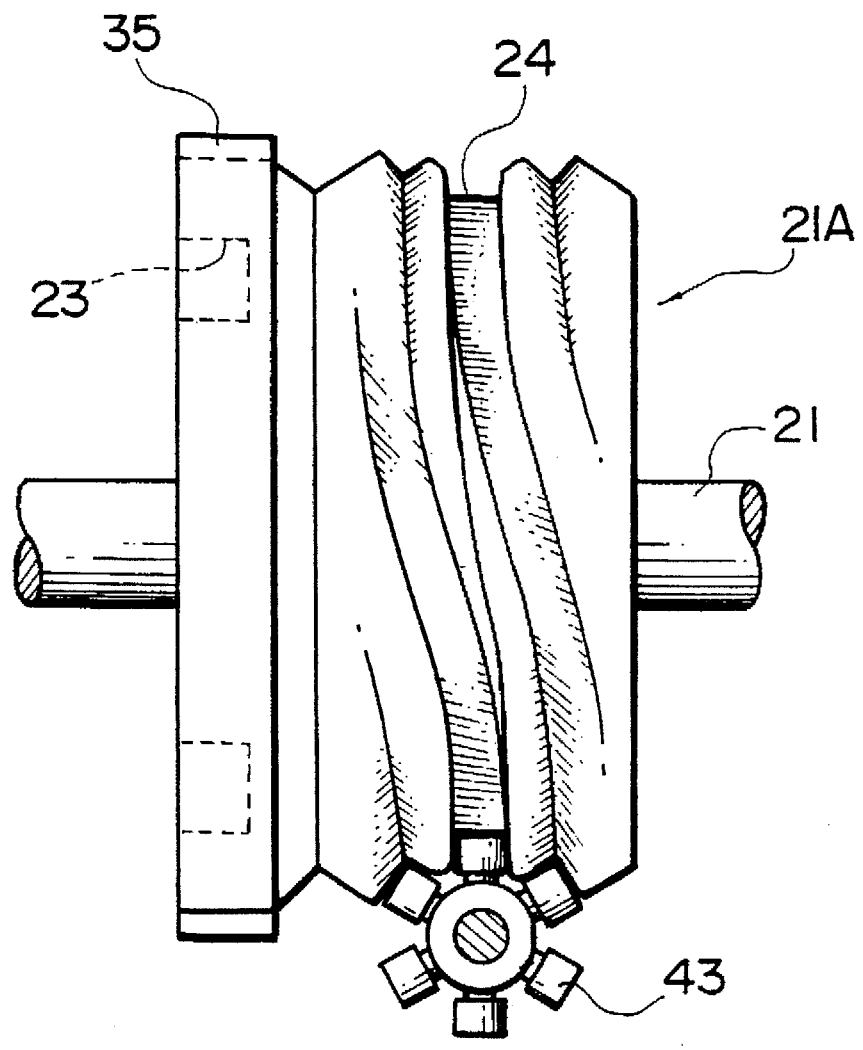
FIG. 7 is an enlarged view of the first cam wheel of the embodiment of FIG. 2.

A cam shaft 21 runs in parallel with the drive shaft 17 and is rotatably held there. A first cam wheel 21A, a second cam wheel 21B and a gear 22 are rigidly fitted to the cam shaft 21. As shown in FIG. 7 in greater detail, the first cam wheel 21A is provided with a first cam 24 for transforming the rotation of the cam shaft 21 into a rotary motion of a changer arm 44, which will be described hereinafter, and a second cam 23 for transforming the rotation of the cam shaft 21 into a linear traveling motion of the changer arm 44. As shown, the first cam 24 is a concave spherical cam. The second cam wheel 21B is provided with a third cam 26 for transforming the rotation of the cam shaft 21 into an opening/closing motion of a sliding cover 61, which will be described hereinafter, and a fourth cam 25 for transforming the rotation of the cam shaft 21 into a clamping/unclamping motion of the spindle by way of a hydraulic circuit.

Additionally, a shift rod 27 is arranged in parallel with the drive shaft 17 and is only axially movable. The shift rod 27 is driven to move by a hydraulic cylinder 29 by way of a shift lever 28. As shown, the hydraulic cylinder 29 is rigidly secured to the top panel of the ATC case 12a. The shift rod 27 is provided with a shift gear 34 that moves with the former and is only allowed to rotate relative to the rod. The shift gear 34 is constantly in mesh with the long gear 19 regardless of the axial movement of the shift rod 27. More specifically, the long gear 19 is made long enough to accommodate any axial movement of the shift gear 34 so that they are held in mesh with each other constantly. In addition, the shift gear 34 selectively comes into engagement either with a gear 22 located on the cam shaft 21 or the gear 33 located on the magazine drive shaft 31, which will be described hereinafter, depending on its movement. Furthermore, a claw 27a is arranged on the right side end of the shift rod 27 in FIG. 5 and selectively comes into engagement with an engaging groove 35 arranged on the periphery of the first cam wheel 21A. The cam shaft 21 is locked when the claw 27a and the engaging groove 35 come into engagement with each other. The left side end 27b of the shift rod 27 in FIG. 5 is projecting out of the ATC case 12a and selectively inserted into an engaging hole 32a arranged in a magazine sprocket 32, which will be described hereinafter. The magazine sprocket 32 is locked when the left side end 27b of the shift rod 27 is inserted into the engaging hole 32a.

A magazine drive shaft 31 is rotatably supported in parallel with the drive shaft 17. An end of the magazine drive shaft 31 projects out of the ATC case 12a and the magazine sprocket wheel 32 is fitted to that end. The magazine sprocket wheel 32 is provided with the engaging hole 32a to be in mesh with the left side end 27b of the shift rod 27b. The engaging hole 32a is located at a position that corresponds to that of a magazine pot 67 for holding a replacement tool. Thus, selected magazine pots 67 are held in position when the magazine sprocket wheel 32 is locked by the shift rod 27. A gear 33 is arranged on the opposite end of the magazine drive shaft 31 and rotates with the magazine sprocket wheel 32 as the magazine drive shaft 31 rotates. The gear 33 selectively operates to transmit the rotation of the drive shaft 17 to the magazine drive shaft 31 depending on the axial position of the shift rod 27.

Since the shift gear 34 is selectively engaged either with the gear 22 of the cam shaft 21 or the gear 33 of the magazine drive shaft 31 depending on the axial position of the shift rod 27, the rotation of the servo motor 14 is selectively transmitted either to the cam shaft 21 or to the magazine drive shaft 31. Thus, referring to FIG. 5, as oil pressure is applied to the left side chamber of the hydraulic cylinder 29 to bring the shift gear 34 into engagement with the gear 22, the front end of the shift rod 27 is driven into the engaging hole 32a of the magazine sprocket wheel 32 and securely held there to block any rotation of the tool magazine. On the other hand, as oil pressure is applied to the right side chamber of the hydraulic cylinder 29 to bring the shift gear 34 into engagement with the gear 33, the claw 27a of the shift rod 27 comes into engagement with the engaging groove 35 of the first cam 24 to block any rotation of the cam shaft 21. Thus, the shift rod 27 and the engaging hole 32a constitute a lock mechanism for the magazine sprocket wheel 32, whereas the shift rod 27 and the engaging groove 35 constitute a lock mechanism for the cam shaft 21.

Figure 6:
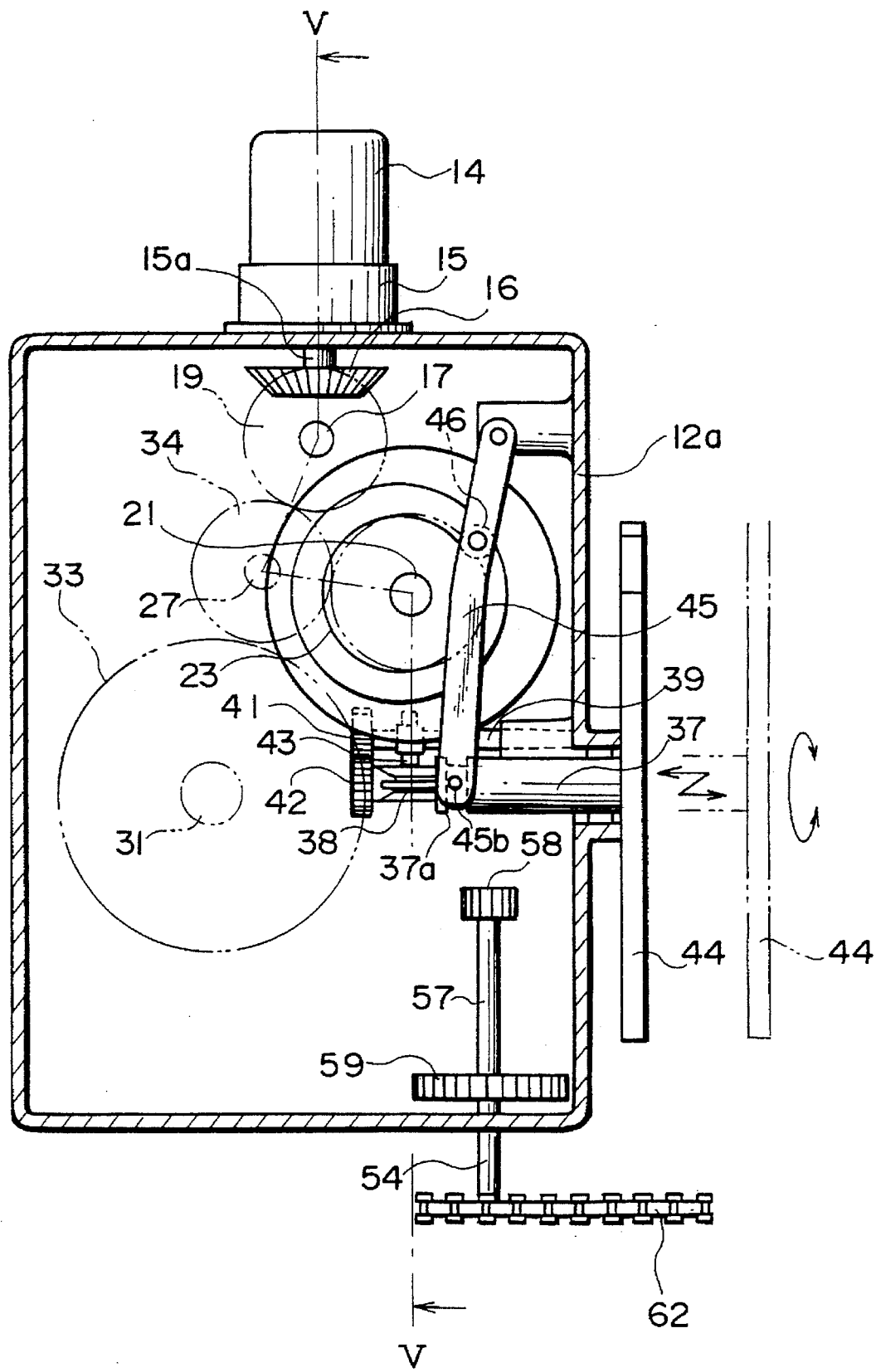
FIG. 6 is a sectional view of the embodiment of FIG. 2 taken along line VI—VI of FIG. 5.

FIG. 6 is a sectional view of the embodiment taken along line VI—VI of FIG. 5 and shows a tool fitted to the spindle 6 and the drive power transmission mechanism of the changer arm 44 for changing the tools held in the magazine pots 67. The changer arm 44 is securely held by an arm shaft 37 at the middle thereof.

The arm shaft 37 runs in parallel with the Z-axis. It is rotatable and axially slidable. Thus, the changer arm 44 swivels in an X-Y plane and slides along the Z-axis as the arm shaft 37 rotates. The changer arm 44 is of a so-called twin type that can hold tools at opposite ends thereof. The arm shaft 37 is provided at the center thereof with a spline hole that engagedly receives a spline shaft 38 that is coaxial with the arm shaft 37. While the arm shaft 37 is rotatable and axially movable as described above, the spline shaft 38 is only rotatable. The arm shaft 37 is provided with an annular groove 37a at the end opposite to the end where the changer arm 44 is located. The annular groove 37a is held in engagement with a pin 45b of a lever 45 pivotably held by the ATC case 12a at a fulcrum 45a. The lever 45 has a cam follower 46 that is engaged with the second cam 23 so that it pivots on its fulcrum 45a as the first cam wheel 21A rotates to drive the arm shaft 37, and hence the changer arm 44, to move reciprocally.

An arm swivelling drive shaft 39 is arranged in parallel with the spline shaft 38 and the gears 41, 42 arranged at the respective front ends thereof are held in mesh with each other. The arm swivelling drive shaft 39 is also provided with a turret-shaped cam follower 43 comprising a number of rollers arranged on the periphery thereof with regular intervals and held in mesh with the first cam 24 on the first cam wheel 21A. Thus, the arm swivelling drive shaft 39 rotates as a function of the profile of the first cam 24. Since the cam follower 43 is realized in the form of a turret, the cam follower 43 and the first cam 24 remain in mesh with each other if the shaft 39 rotates. As the arm sewing drive shaft 39 rotates, it drives the arm shaft 37 to rotate and the changer arm 44 to swivel by way of the gears 41, 42 and the spline shaft 38.

As described above, the swivelling motion and the reciprocating motion of the changer arm 44 is controlled respectively by the first and second cams 24 and 23. The profiles of the cams and the gear ratios of the gears 41 and 42 are so determined that the changer arm 44 moves to describe a desired locus. The swivelling and reciprocating motions of the changer arm 44 will be described in greater detail hereinafter along with the functions of the other mechanisms.

Figure 8:
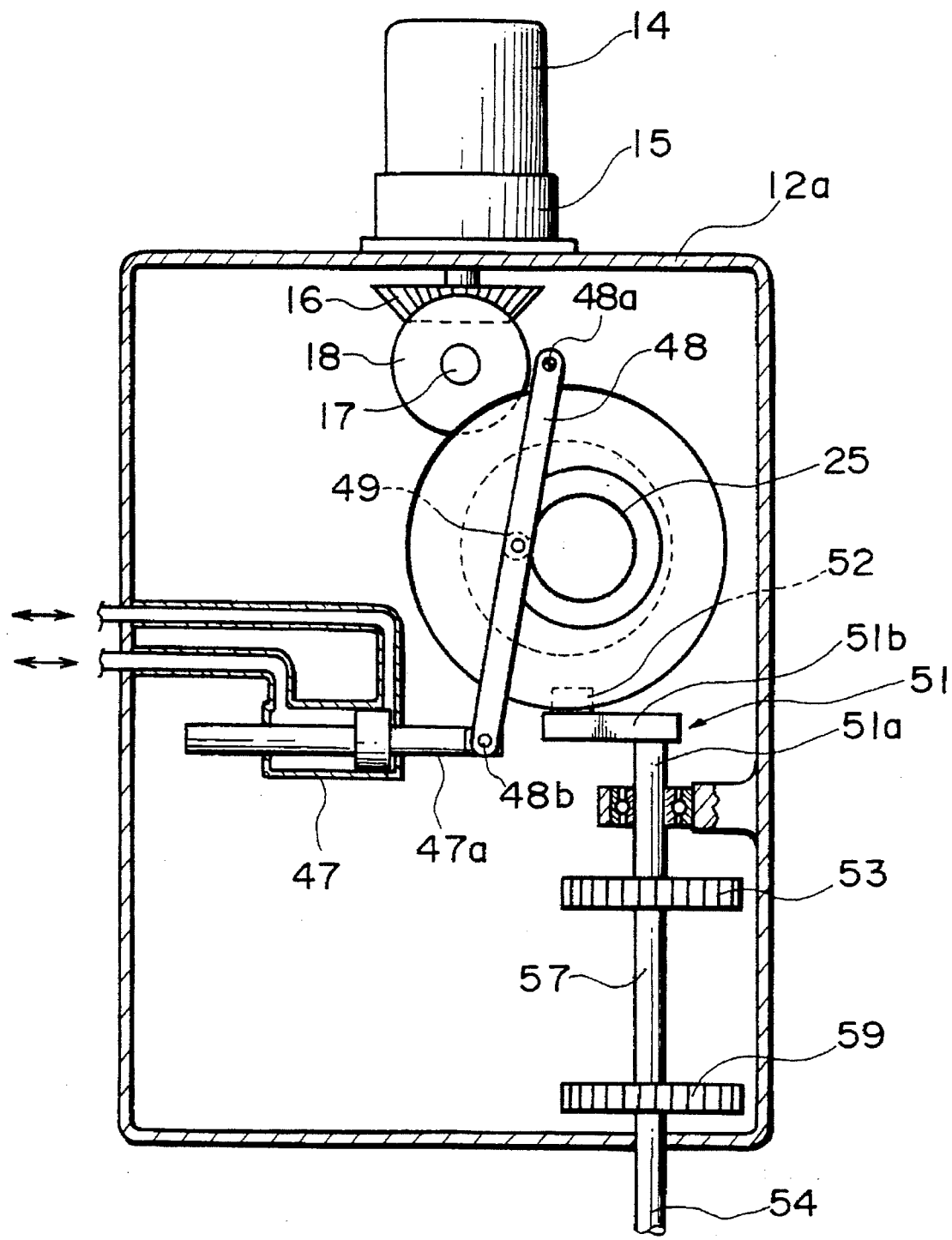
FIG. 8 is a sectional view of the embodiment of FIG. 2 taken along line VIII—VIII of FIG. 5.

FIG. 8 is a sectional view of the embodiment taken along line VIII—VIII of FIG. 5 and shows in detail the mechanism for driving the hydraulic pump 47 and the power transmission mechanism for driving the sliding cover 61 to become open or closed. The hydraulic pump 47 constitutes part of the clamping/unclamping control mechanism of the machine tool and will be described hereinafter in greater detail.

The hydraulic pump 47 is provided with a piston rod 47a, which is arranged in parallel with the Z-axis and engaged at an end thereof with a pin 48b of a lever 48. The lever 48 pivots on a fulcrum 48a realized by a pin rigidly secured to the ATC case 12a, and is provided with a follower 49 that is in mesh with the fourth cam 25 arranged on a lateral side of the second cam wheel 21B. Thus, the lever 48 pivots to reciprocate the piston rod 47a as the second cam wheel 21B rotates. Then, as the piston rod 47a reciprocates, actuator oil is fed from or collected by the hydraulic pump 47.

The power transmission mechanism for driving the sliding cover 61 to become open or closed has a configuration as described above. A crank 51 is rigidly secured to a crank shaft 51a, which is rotatably supported by the ATC case 12a, and swingingly rotatable both clockwise and counterclockwise. A crank arm 51b is rigidly secured to an end of the crank shaft 51a and provided with a cam follower 52, the cam follower 52 being held in mesh with the third cam 26 arranged on the second cam wheel 26. A gear 53 is fitted to the other end of the crank shaft 51a. As seen from FIG. 5, the rotation of the crank shaft 51a is transmitted to an intermediate shaft 57 and also to a sprocket wheel 56 by way of a cover opening/closing shaft 54. The intermediate shaft 57 is provided at the opposite ends thereof with respective gears 58 and 59, whereas the cover opening/closing shaft 54 is provided at an end with a gear 55 and at the other end with a sprocket wheel 56. The gear 53 is in mesh with the gear 58, while the gear 59 is in mesh with the gear 55 so that the crank 51 and the sprocket wheel 56 rotate to show a ratio of rotation defined by the gear ratios of these combined gears. As described earlier, the third cam 26 is arranged on a lateral side of the second cam wheel 21B and, therefore the rotary angle of the crank 51 is subjected to a limitation defined by the length of the second cam wheel 21B. More specifically, since the second cam wheel 21B is not very long, the crank 51 is not allowed to have a large rotary angle. However, as seen from FIG. 5, the gear ratio of the power transmission mechanism is so selected as to provide an over-drive gear arrangement so that the sprocket wheel 56 rotates enough to completely open or close the sliding cover 61 when the crank 51 is rotated only slightly.

The sliding cover 61 is designed to protect the ATC 12 from the dust produced by machining operations and is arranged vertically near the lateral wall of the ATC 12 on the side of the column 4 in such a way it can be moved to reach its open or closed position. An endless chain 62 is vertically arranged on the bed 1 in parallel with the sliding door 61 and engaged with the sprocket wheel 56 so that it can circulate along a given track. The chain 62 is secured to the sliding cover 61 at a point thereof.

Thus, as the crank 51 is swingingly rotated by the third cam 26, the sliding cover 61 is moved along the Z-axis by a distance defined by the rotary angle of the crank 51.

Now, the clamping/unclamping control mechanism of the tool changer will be described by referring to FIGS. 3 and 4. Note that the hydraulic pump 47 and the hydraulic cylinder 63 are connected by way of a pair of oil lines indicated by solid lines in these figures.

The hydraulic cylinder 63 is coaxial with the spindle 6 and rigidly secured to the rear end of the latter 6. The front end of the piston rod 63a of the hydraulic cylinder 63 is disposed vis-a-vis the rear end of the draw bar 8 with a narrow clearance therebetween.

As the draw bar 8 is pushed at the rear end by the piston rod 63a, it is moved forward to become disengaged from the pull stud Ta of the collet 11. Consequently, the tool T is unclamped. On the other hand, as the piston rod 63a retreats, the draw bar 8 is moved back by the urging force of the counter-sunk springs 9 so that the collet 11 firmly clamps the pull stud Ta.

The oil lines connecting the hydraulic pump 47 and the hydraulic cylinder 63 are provided with a two-position changeover valve 65 and a pair of relief valves 60A and 60B. The two-position changeover valve 65 is connected to the hydraulic pump 47 and the hydraulic cylinder 63 in its first position, and cuts them off in its second position. The relief valves 60A and 60B connects the two oil lines that are linked to the hydraulic pump 47 when the pressure difference between them exceeds a predetermined level. Thus, the hydraulic pump can extends its stroke even when the hydraulic cylinder 63 has finished its full stroke. In other words, the hydraulic cylinder 63 is guaranteed to reach the end of its full stroke by selecting a relatively large value for the stroke of the hydraulic pump 47. It should be noted that, if a buffer mechanism comprising the relief valves a and 60B is not provided, the stroke of the hydraulic pump 47 has to be made to strictly agree with that of the hydraulic cylinder 63. Otherwise, excessive pressure can be generated in the oil lines and/or the hydraulic cylinder 63 can show an insufficient stroke. Therefore, the level of precision required for the manufacture of the hydraulic pump 47 and the hydraulic cylinder 63 can be reduced by arranging a pair of relief valves a, 60B to consequently reduce the cost of manufacture. While the above description concerning the stroke of the hydraulic pump 47 and that of the hydraulic cylinder 63 is based on the assumption that the piston surface area of the hydraulic pump 47 is equal to that of the hydraulic cylinder 63, it may also be applicable to cases where the piston surface area of the hydraulic pump 47 is not equal to that of the hydraulic cylinder 63 simply by reading the strokes as the capacities of the cavities in the cylinder separated by the piston thereof. In other words, the capacity of one of the cavities of the hydraulic cylinder 63 is made greater than that of the other cavity that is connected to the former by oil lines.

The clamping/unclamping control mechanism of the tool changer operates in a manner as described below. As the shift rod 27 moves leftward in FIG. 5 until the shift gear 34 comes into engagement with the gear 22, the rotation of the drive shaft 17 is transmitted to the cam shaft 21. The lever 48 is the pivoted as a function of the profile of the fourth cam 25 arranged on the second cam wheel 21B to reciprocate the piston rod 47a of the hydraulic pump 47, and actuator oil is fed to the hydraulic cylinder 63 to reciprocate the piston rod 63a of the hydraulic cylinder 63. The draw bar 8 is then made to reciprocate to consequently clamp or unclamp the tool T.

The oil line of the hydraulic system is branched between the hydraulic cylinder 63 and the two-position changeover valve 65 and the hydraulic cylinder 63 is connected to an oil source (not shown) by way of a three-position changeover valve 64. During the clamping/unclamping operation, the three-position changeover valve 64 is held at its closed position (d). If the tool changing operation is conducted manually without using the ATC 12, the two-position changeover valve 65 is held at its closed position (b), whereas the three-position changeover valve 64 is put at its connecting position (c) or (e) depending on the sense of the current stroke so that actuator oil is fed from the external oil source to driven the hydraulic cylinder to operate.

Figure 9:
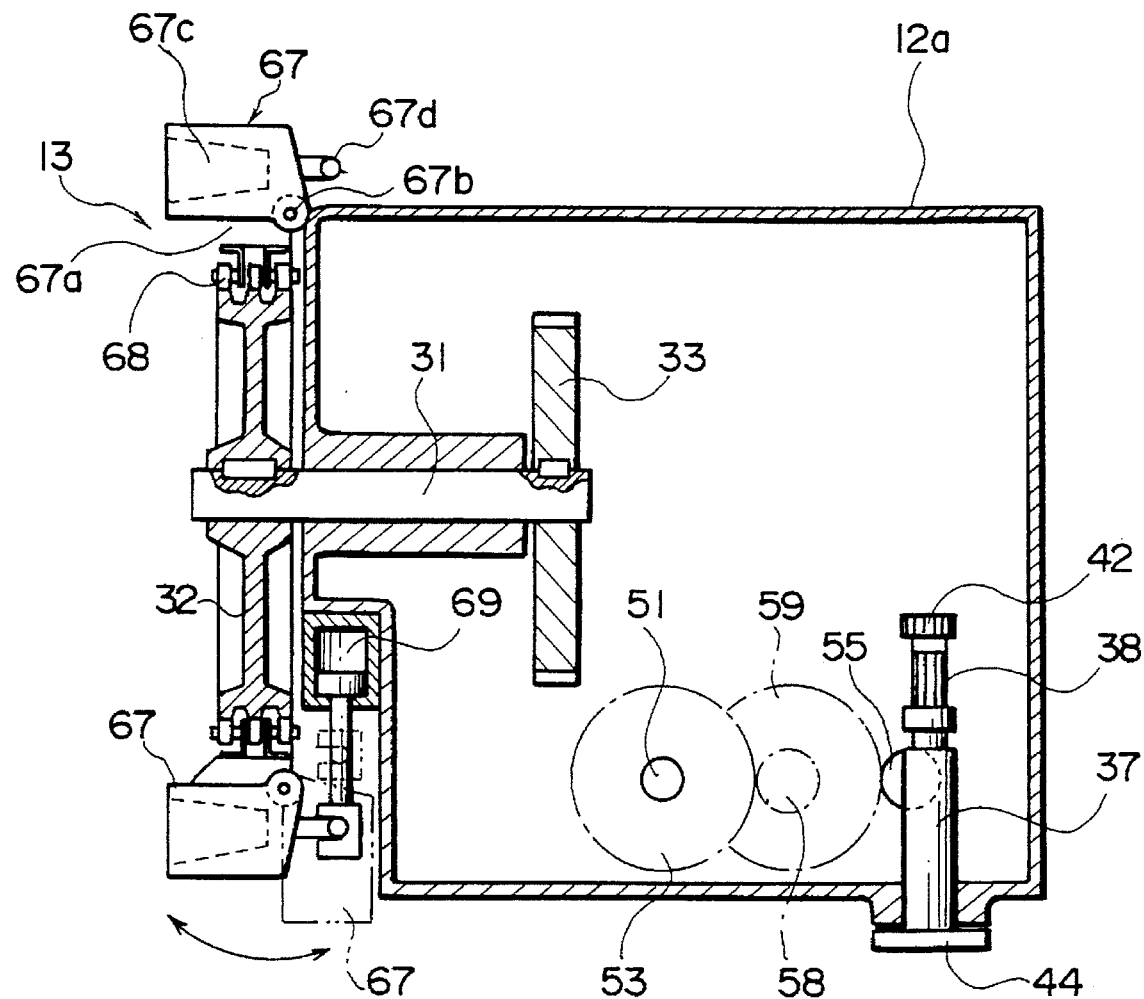
FIG. 9 is a sectional view of the embodiment of FIG. 2 taken along line IX—IX of FIG. 5.

FIG. 9 is a sectional view of the embodiment taken along line IX—IX of FIG. 5, illustrating the drive mechanism of the tool magazine 13 for holding a plurality of tools and moving a selected tool to the tool changing position in a tool changing operation.

The magazine pots 67, each of which contains a single tool, are connected endlessly by an endless pot chain 68 that can circulate along a track and driven by the magazine sprocket wheel 32 so that the magazine pots 67 may be placed in position for a tool changing operation by indexing. Each of the magazine pots 67 is rotatable around a rotary shaft 67b relative to the base 67a and provided with a tool receiving section 67c for holding a tool there. An L-shaped arm 67d outwardly projects from the back of the tool receiving section 67c. The L-shaped arm 67d of the magazine pot 67 held in position for a tool changing operation by indexing is brought into engagement with the arm of a hydraulic actuator 69 disposed to the left of the ATC 12 in FIG. 2. As the arm of the hydraulic actuator 69 is retracted, the tool receiving section 67c is rotated to the position shown by a double-dotted broken line in FIG. 9. Thus, the tool directed along the X-axis of the tool changer is now directed along the Z-axis of the tool changer.

Figure 10:
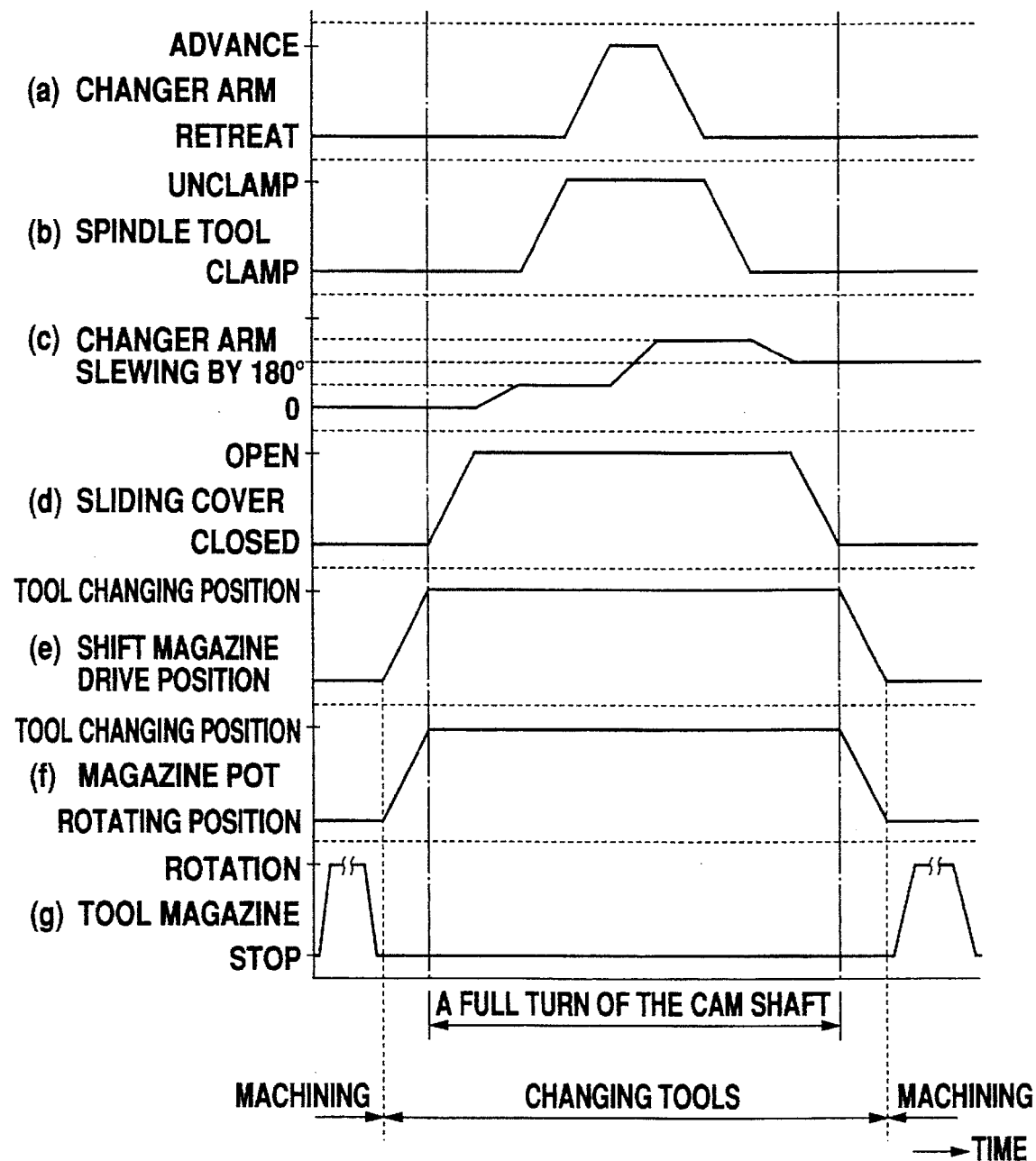
FIG. 10 is a timing chart of the operation of the embodiment of the ATC of FIG. 2.

Now, the overall operation of the embodiment will be described by referring to FIG. 10 illustrating a timing chart for the embodiment.

In a machining cycle indicated by line (e) in FIG. 10, the shift rod 27 is located in the magazine drive position. Under this condition, actuator oil is fed to the right side chamber of the hydraulic cylinder in FIG. 5 and the shift lever 27 is secured to its right side position by way of the shift lever 28. Then, the shift gear 34 is in mesh with the gear 33 and the front end 27b of the shift rod is drawn out of the hole 32a of the magazine sprocket wheel 32. The claw 27a of the shift rod is in mesh with the engaging groove 35 of the first cam wheel 21A to lock the cam shaft 21 against rotation.

When a command is issued from a numerical control unit controlling the machine tool to pick up the tool to be used next (next tool), the tool magazine starts rotating according to the plot (g) of FIG. 10. As described above, the shift rod 27 is in the position for driving the magazine so that the rotation of the drive shaft 17 can be transmitted to the magazine drive shaft 31 by way of the gears 19, 34, 33. Then, the servo motor 14 drive the magazine sprocket wheel 32 to rotate until the magazine pot 67 holding the next tool reaches the tool changing position. Once the desired magazine sprocket wheel reaches to the tool changing position or the position of the hydraulic actuator 69, the tool magazine stops there and waits for the completion of the current machining cycle.

When the machining cycle is over, as shown by plot (e) of FIG. 10, the shift rod 27 moves to the tool changing position as actuator oil is fed to the left side chamber of the hydraulic cylinder 29. At this position, the front end 27b of the shift rod 27 is moved into the engaging hole 32a of the magazine procket wheel 32 to lock the wheel 32. On the other hand, the shift gear 34 comes into engagement with the gears 22 and 19 to transmit the rotation of the drive shaft 19 to the cam shaft 21. Meanwhile, since the shift gear 34 is disengaged from the gear 33 of the magazine drive shaft 31, no drive power is transmitted to the magazine drive shaft 31. Additionally, the claw 27a of the shift rod 27 is released from the engaging groove 35 of the first cam wheel 21A to make the cam shaft 21 rotatable.

When the shift rod 27 is perfectly located in position for changing tools, the servo motor 14 starts operating under the command of the numerical control unit. The rotation motion of servo motor is then transmitted to drive the cam shaft 21 to rotate by way of the drive shaft 17 and the gears 19, 34, 22. The first, second, third and fourth cams rotate by way of the cam shaft 21. These cams operate to control the respective mechanisms for proper operation for which they are responsible. Plots (a), (b), (c) and (d) of FIG. 10 illustrate the timings of the respective operations of the mechanisms. Differently stated, the cams have respective profiles that are adapted to the operations that proceed with the illustrated respective timings.

Firstly, the sliding cover 61 is opened by the third cam 26 (plot (d)). Then, the changer arm 44 is rotated clockwise by 90° by the first cam 24 to hold the next tool being held in the magazine pot 67 that has been rotated by the hydraulic actuator 69 and, at the same time, the tool (current tool) currently fitted to the spindle 6 (plot (c)). The hydraulic pump 47 is driven to operate by the fourth cam 25 under this condition in order to cause the piston rod 63a of the hydraulic cylinder 63 to push the draw bar 8. Thus, the current tool is unclamped (plot (b)). Note that, when the hydraulic pump 47 and the hydraulic cylinder 63 is in motion, the three-position changeover valve 64 of the oil line is in its closed position, whereas the two-position changeover valve 65 is in its connected position.

Subsequently, the changer arm 44 is moved forward by the second cam 23 to take up the current tool and the next tool held at the respective opposite ends of the changer arm 44 from the spindle 6 and the respective magazine pots 67 (plot (a)).

Subsequently, the changer arm 44 is rotated additionally by 180° by the first cam 24 to move the current tool to the position of the next tool and vice versa (plot (b)). Then, the changer arm 44 is retracted by the second cam 23 and the next tool is led into the spindle 6, while the current tool is put into the magazine pot 67 (plot (a)). Additionally, the hydraulic pump 47 is driven to operate by the fourth cam 25 to retract the piston rod 63a, while the draw bar 8 is pulled in by the urging force of the coned disk springs 9 so that the next tool is clamped to the spindle 6 (plot (b)). Then, the changer arm 44 is reversely rotated by 90° by the first cam 24 to become ready for the next tool changing operation (plot (c)). Note that the changer arm 44 is symmetrical about axis of rotation and hence the above mentioned stand-by position is equivalent to the position it takes before a tool changing cycle. In other words, the stand-by position is the position where it is ready for the next tool changing cycle. Finally, the sliding cover 61 is closed by the third cam 26 and the servo motor stops its rotary operation.

Then, as actuator oil is fed to the right side chamber of the hydraulic cylinder 29, the shift rod 27 is moved to the position for driving the tool magazine. The magazine pot 67 is directed to its rotating position and stays there until it receives another command for indexing the next tool.

The electric current fed to the servo motor 14 in each of the above operation cycles of the ATC is constantly monitored by a current monitor system of the numerical control unit so that the servo motor is automatically and immediately made to stop operating whenever an abnormal situation occurs, such as an accidental collision of the changer arm 44 and the tool T due to a foreign object taken up into the tool changer.

Figure 11:
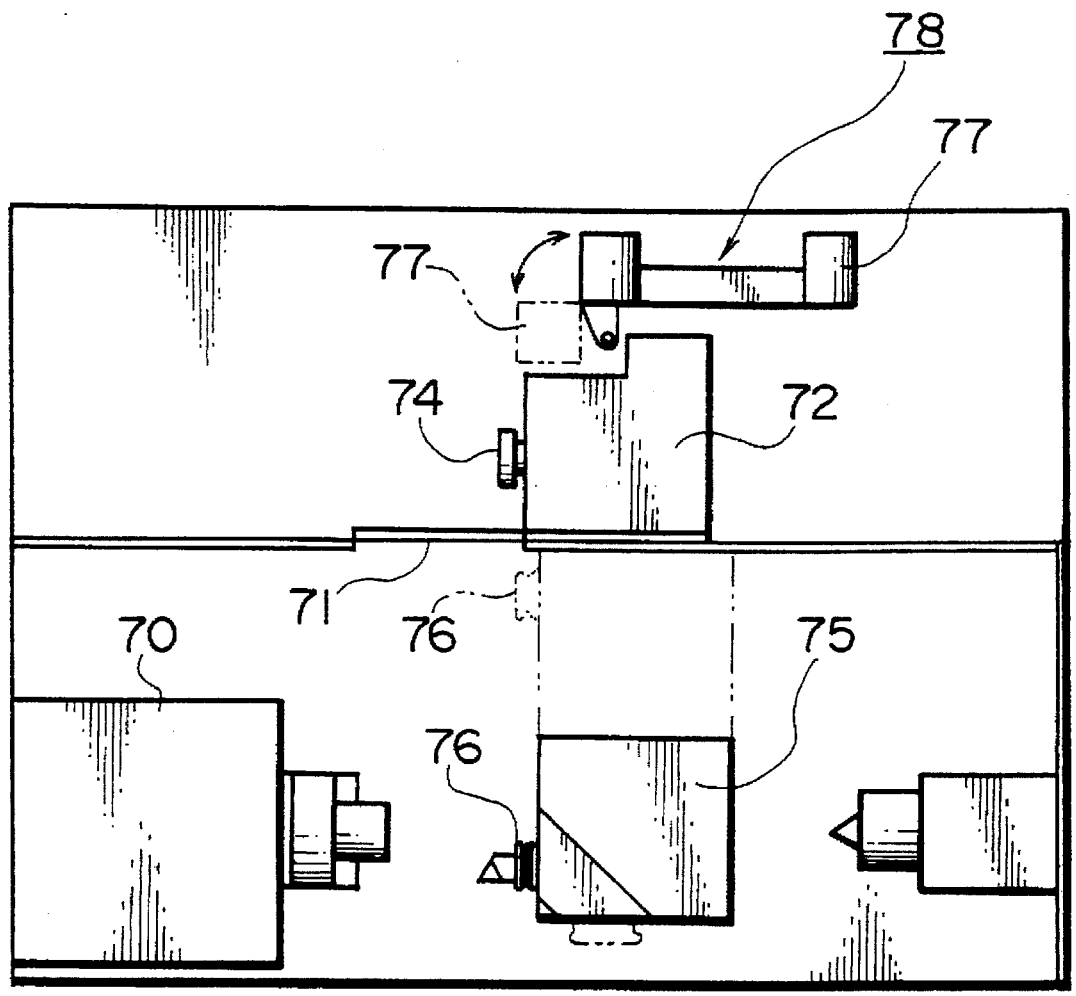
FIG. 11 is a schematic plan view of a lathe provided with another embodiment of an ATC according to the invention.

While the present invention has been described above in terms of a machining center comprising a four-cam type ATC, it is not limited thereto and may also be applied to a different machine tool such as a lathe, as shown in FIG. 11.

When an ATC according to the invention is applied to a lathe, the ATC main body 72 is so arranged that its changer arm 74 that is made to swivel around the Z-axis is directed to the spindle bed 70 and it is also separated from the lathe main body by means of a sliding cover 71. The magazine pot 77 held in position for changing tools by indexing and directed to the spindle along the Z-axis, and the tool shaft 76 arranged on a cutter bed 75 and also held in position for changing tools, are operated for changing tools by means of a twin-type changer arm 74, and the sliding cover 71 is moved to its open/closed position in synchronism with the changing tool operation. The tool magazine is swivelled and indexed by a single motor by way of a shift gear.

What is claimed is:

1. A machine tool comprising a plurality of tools stored in a tool magazine and a tool changer for selecting a desired tool out of the magazine and replacing the tool currently held by the tool holding mechanism of the machining unit of the machine tool with the newly selected tool, wherein said tool exchanger comprises;

an exchanger arm for holding the replacing tool and the tool currently fitted to the machining unit;

an exchanger arm drive mechanism for moving said exchanger arm back and forth and swivelling it;

a clamp for securing a tool to the machining unit;

a clamping/unclamping control mechanism for controlling the operation of said clamp;

a protective cover for protecting said tool changer from the dust produced by a machining operation;

a protective cover opening/closing mechanism for removing said protective cover at the time of changing tools;

said exchanger arm drive mechanism comprising a first cam for controlling the swivelling motion of said exchanger arm and a second cam for controlling the reciprocating motion of said exchanger arm;

said clamping/unclamping control mechanism comprising a third cam for controlling the clamped or unclamped state of the tool held by the machining unit;

said protective cover drive mechanism comprising a fourth cam for controlling the opening/closing motion of said protective cover; and a unitary drive motor for simultaneously driving said first, second, third and fourth cams.

2. A machine tool according to claim 1, additionally comprising:

a tool indexing mechanism for driving said tool magazine to rotate and index a desired tool to a tool changing position;

a switch mechanism for connecting said drive motor selectively to said four cams or to said tool indexing mechanism; wherein;

said tool indexing mechanism is driven to operate by the drive motor for driving said four cam.

3. A machine tool according to claim 2, wherein said first, second, third and fourth cams are fitted to a single cam shaft.

4. A machine tool according to claim 3, additionally comprising a lock mechanism that locks the tool indexing mechanism when the four cams are selected and connected to the drive motor and said cam shaft when the tool indexing mechanism is selected and connected to the drive motor.

5. A machine tool according to claim 4, wherein said clamping/unclamping control mechanism comprises:

a hydraulic pump driven by the third cam;

a hydraulic cylinder disposed on the tool holding mechanism of the machining unit, a pair of oil lines, each connecting a cavity of the hydraulic pump and that of the hydraulic cylinder; and a relief valve for partly releasing the actuator oil in either one of the oil lines to the other oil line when it shows a pressure exceeding a predetermined level; wherein said hydraulic pump discharges an amount of actuator oil greater than the volume of cavity of the hydraulic cylinder.

* * * * *